United States Patent
Kolb et al.

(10) Patent No.: US 9,981,522 B2
(45) Date of Patent: May 29, 2018

(54) SUSPENSION DEVICE AND METHOD

(71) Applicant: GRAMMER AG, Amberg (DE)

(72) Inventors: Jens Kolb, Koenigstein (DE); Tobias Sonnleitner, Nuremberg (DE)

(73) Assignee: GRAMMER AG, Amberg (DE)

( * ) Notice: Subject to any disclaimer, the term of this patent is extended or adjusted under 35 U.S.C. 154(b) by 0 days. days.

(21) Appl. No.: 15/383,150

(22) Filed: Dec. 19, 2016

(65) Prior Publication Data

US 2017/0182856 A1 Jun. 29, 2017

(30) Foreign Application Priority Data

Dec. 23, 2015 (DE) .......................... 10 2015 122 777

(51) Int. Cl.
*B60G 17/0165* (2006.01)
*B60G 15/12* (2006.01)
(Continued)

(52) U.S. Cl.
CPC .......... *B60G 17/0165* (2013.01); *B60G 15/12* (2013.01); *B60G 17/0195* (2013.01); *B60G 17/01908* (2013.01); *B60N 2/38* (2013.01); *B60N 2/501* (2013.01); *B62D 33/0604* (2013.01); *F16F 15/00* (2013.01);
(Continued)

(58) Field of Classification Search
CPC ................ B60G 17/0165; B60G 15/12; B60G 17/01908; B60G 17/095; B60G 2300/082; B60G 2400/821; B60N 2/501
See application file for complete search history.

(56) References Cited

U.S. PATENT DOCUMENTS

| | | | | |
|---|---|---|---|---|
| 5,555,501 A | * | 9/1996 | Furihata | B60G 17/0152 180/89.12 |
| 5,603,387 A | * | 2/1997 | Beard | B60G 17/0152 180/89.12 |

(Continued)

FOREIGN PATENT DOCUMENTS

| | | |
|---|---|---|
| DE | 4321152 A1 | 1/1995 |
| DE | 10050569 A1 | 5/2001 |

(Continued)

OTHER PUBLICATIONS

Extended European Search Report for European Patent Application No. 16202459.0, dated May 29, 2017, 3 pages.

(Continued)

*Primary Examiner* — Faye M Fleming
(74) *Attorney, Agent, or Firm* — Sheridan Ross P.C.

(57) ABSTRACT

Suspension unit, comprising a control unit, for a utility vehicle, wherein the utility vehicle has a body floor, to which a first and a second axle are connected, wherein the utility vehicle comprises at least one vehicle seat and/or a vehicle cab that can be suspended by a suspension device relative to the body floor, wherein the vehicle seat and/or the vehicle cab is arranged substantially above the second axle seen in a vertical direction, wherein, when driving over a bump with the first axle, a value of a deflection of the first axle by the disturbance can be determined by at least one sensor, and wherein the suspension device of the vehicle seat and/or vehicle cab can be varied by the control unit before or upon driving over the disturbance with the second axle.

12 Claims, 4 Drawing Sheets

(51) Int. Cl.
  *B60G 17/019* (2006.01)
  *B60G 17/0195* (2006.01)
  *B60N 2/50* (2006.01)
  *B62D 33/06* (2006.01)
  *B60N 2/38* (2006.01)
  *F16F 15/00* (2006.01)
  *F16F 15/027* (2006.01)

(52) U.S. Cl.
  CPC ...... *F16F 15/0275* (2013.01); *B60G 2202/15* (2013.01); *B60G 2202/24* (2013.01); *B60G 2202/412* (2013.01); *B60G 2202/413* (2013.01); *B60G 2202/42* (2013.01); *B60G 2300/082* (2013.01); *B60G 2400/204* (2013.01); *B60G 2400/40* (2013.01); *B60G 2400/821* (2013.01); *B60Y 2200/221* (2013.01)

(56) References Cited

U.S. PATENT DOCUMENTS

| | | | |
|---|---|---|---|
| 5,899,288 A | 5/1999 | Schubert et al. | |
| 6,273,203 B1 * | 8/2001 | Paggi | B62D 33/0608 180/89.13 |
| 8,840,172 B2 * | 9/2014 | Haller | B60G 17/0155 296/190.07 |
| 9,200,429 B2 * | 12/2015 | Thompson | B60G 17/005 |
| 2005/0278094 A1 | 12/2005 | Swinbanks et al. | |
| 2007/0044654 A1 | 3/2007 | Schedgick et al. | |
| 2017/0096144 A1 * | 4/2017 | Elie | B60W 10/18 |
| 2017/0293814 A1 * | 10/2017 | Elie | B60R 11/04 |

FOREIGN PATENT DOCUMENTS

| | | |
|---|---|---|
| DE | 102004057679 A1 | 6/2006 |
| EP | 1661796 | 5/2006 |
| EP | 2048008 | 4/2009 |
| JP | H04-243613 | 8/1992 |
| WO | WO 99/24311 | 5/1999 |

OTHER PUBLICATIONS

Search Report prepared by the German Patent Office dated Nov. 15, 2016, for German Patent Application No. 10 2015 122 777.0.

* cited by examiner

SUSPENSION DEVICE AND METHOD

CROSS-REFERENCE TO RELATED APPLICATIONS

This application claims the benefit of German Patent Application No. 10 2015 122 777.0 filed Dec. 23, 2015, the entire contents of which are incorporated herein by reference.

FIELD

The invention relates to a suspension unit, comprising a control unit, for a utility vehicle, wherein the utility vehicle has a body floor, to which a first and a second axle are connected, wherein the utility vehicle comprises at least one vehicle seat and/or a vehicle cab that can be suspended relative to the body floor by a suspension device, wherein the vehicle seat and/or the vehicle cab is arranged substantially above the second axle seen in a vertical direction.

BACKGROUND

Suspension units are known from the prior art, wherein a suspension and/or a damping of the suspension unit are varied dependent on detected sensor data. The sensors are arranged in this case in the vicinity of the vehicle seat, in order thus to be able to determine the effects of external influences on the vehicle seat, for example when driving over bumps. Hitherto, however, it has been possible to react only to an already advanced action of the vehicle seat or the vehicle cab, for example a deflection of the seat/cab, in particular with a correspondingly longer signal processing time.

It is disadvantageous, however, to make a change to the suspension or the damping when a deflection is already taking place. This is because if the vehicle drives over a bump, certain sensor data are recorded and these are then used to adjust the suspension or the damping. However, since a certain signal processing time is necessary for this, the suspension unit is only adapted after a certain time, thus delayed in time relative to driving over the bump, to the deflection on account of the suspension unit.

SUMMARY

The object of the present invention is accordingly to provide a suspension unit and a method by means of which it is possible to adapt the suspension device of the vehicle seat and/or the vehicle cab correspondingly already before or upon driving over a bump.

This object is achieved according to the features of claim 1. Advantageous configurations of the invention are found in the dependent claims.

The core concept of the invention is a suspension unit, comprising a control unit, for a utility vehicle, wherein the utility vehicle has a body floor, to which a first and a second axle are connected, wherein the utility vehicle comprises at least one vehicle seat and/or a vehicle cab that can be suspended relative to the body floor by a suspension device, wherein the vehicle seat and/or the vehicle cab is arranged substantially above the second axle seen in a vertical direction, wherein, when driving over a bump with the first axle, a value of a deflection of the first axle by the disturbance can be determined by at least one sensor, wherein the suspension device of the vehicle seat and/or the vehicle cab can be varied by the control unit before or upon driving over the disturbance with the second axle. In particular, the suspension device can be varied as a function of the value of the deflection determined by the control unit.

According to the invention, the suspension device can be preconditioned or varied due to the knowledge of the value determined, meaning that the suspension device can be varied already before or upon driving over a disturbance, in particular a bump, with the second axle accordingly by the value determined by means of the control unit when driving over the disturbance with the first axle. Thus an active control or adjustment of the suspension device is involved in particular in this case.

In particular, the second axle reacts in the same proportion as the first axle if the second axle substantially follows the track of the first axle, in particular above a certain speed of the second axle.

Utility vehicle is understood to mean a vehicle that can be used in the agricultural sector in particular, such as a tractor or self-propelled machine, for example.

Since utility vehicles of this kind are frequently used on farmland, the utility vehicles often come into contact with various bumps in the ground, such as ridges and troughs in the soil.

These utility vehicles naturally comprise a body floor, to which the first and the second axle are connected. The body floor is preferably formed in one piece or formed by several components, wherein the components are connected rigidly to one another. The first and the second axle are preferably the wheel axles of the utility vehicle, wherein the wheels and/or tyres of the vehicle are arranged on the first and second axle. Alternatively or cumulatively it is also conceivable that each wheel of the vehicle can be connected individually by a single wheel suspension to the first axle or the second axle.

Furthermore, the vehicle seat and/or the vehicle cab is arranged substantially above the second axle seen in a vertical direction. The second axle is preferably the axle that has no steering. "Substantially" in this case means that the dimensions of the vehicle seat and/or the vehicle cab are significantly larger than the dimensions of the second axle, so that only a part of the seat and/or the cab is arranged above the second axle. The first and the second axle advantageously run in a vehicle width direction.

If the utility vehicle drives over a bump with the first axle, then the axle is deflected by the force impact, thus its position is changed, due to the bump. It is irrelevant in this case whether the bump acts on the left and the right wheel of the first axle or only on one of the two wheels. The first axle of a tractor or the like is usually a suspended axle, so that the deflection experienced due to the bump can be compensated for. The second axle, on the other hand, is mostly an unsprung axle, so that the effect of the bump on the second axle is accordingly transmitted unsprung to the vehicle and consequently to the vehicle seat or the vehicle cab.

Furthermore, the disturbance or bump causes a lift and/or a swinging of the first axle, wherein a virtual swinging of the first axle takes place in the case of a single-wheel suspension. By driving over the disturbance with the first axle, an impulse is also indeed transmitted directly to the vehicle seat and/or the vehicle cab, but the impulse is considerably smaller than the impulse due to driving over the disturbance with the second, rigid axle. According to the invention, this impulse can be counteracted already before driving over the disturbance with the second axle by means of the determined values of the first axle and the variation of the suspension device by the control device before or upon driving over the disturbance due to the determined value.

The value of the deflection of the first axle is detected by at least one sensor and is preferably also stored in a storage device of the control unit.

According to a preferred embodiment, the determined value of the deflection can be compared by the control unit with a specifiable critical value, wherein the suspension device can be varied by the control unit if the critical value is exceeded.

The value of the deflection can be compared with a specifiable critical value by the control unit. The critical value is to be understood here as the maximum force impact on the vehicle seat and/or the vehicle cab, which impact can be processed by the passive suspension device forming the basis.

If the critical value is exceeded, the suspension device is controlled actively, in order thus to prevent a critical force impact on the vehicle seat and the vehicle driver sitting on it. If the critical value is exceeded, it is to be assumed that the present suspension travel of the suspension device is no longer adequate, so that the suspension device must be actively adjusted to be able to provide an adequate suspension travel. This concerns the suspension travel both in a horizontal and a vertical direction.

According to another preferred embodiment, the suspension device is variable by the control unit continuously as a function of the determined value of the deflection.

A deflection of the first axle generally has the effect on the vehicle that when driving over a bump, the vehicle and in particular the first axle experience a swinging, which corresponds to a pitching, rolling or even a yawing of the first axle and accordingly of the vehicle depending on the rotation about an axis of motion relative to the vehicle. Due to the swinging of the first axle and driving over the bump with the second axle, the second axle also experiences a swinging movement. A swinging of the second axle has effects in particular on the horizontal suspension of the vehicle seat and/or the vehicle cab, since a swinging movement of the seat or the cab is likewise taken up by the horizontal suspension.

According to the invention, the entire disturbance information is known by driving over the disturbance by means of the first axle. In particular, it can be calculated by the control unit when the vehicle drives over the disturbance with the second axle. For this, it is necessary for the value of the wheelbase, which is regarded as constant, and the speed of the vehicle to be known.

In addition to the active adjustment, thus supply of a force or an active spring characteristic curve adjustment, an adjusted damper would also be conceivable. In this case its counteraction can be commenced right at the onset of the impulse, thus when driving over a disturbance, and not only after detection of the suspension of the vehicle seat and/or the vehicle cabin. Here damper forces opposing the movement can be introduced at the start of the impulse. A gain in additional suspension travel is advantageously achieved by this.

According to a preferred embodiment, the suspension device comprises at least one suspension element and at least one damper element. The damper element can be formed as a standard single- or twin-tube damper, wherein other configuration options are also conceivable. The suspension element is advantageously formed as a fluid spring.

According to another preferred embodiment, the suspension device comprises at least one actuator, which is operable electrically and/or pneumatically and/or hydraulically.

The spring characteristic curve of the suspension device can be varied advantageously by an actuator. In particular, the suspension device can be actively adjusted by the actuator, so that according to the invention the suspension device is variable by the control unit according to the effect of the disturbance. The actuator can advantageously be a hydraulic cylinder subject to slippage. The actuator can also advantageously be a linear adjustment, in particular without self-locking.

According to an especially preferred embodiment, the at least one sensor is arranged on the first axle, so that the force impact on the first axle can be determined particularly advantageously. Furthermore, it is advantageous if the at least one sensor comprises or is formed as an acceleration sensor and/or an angle sensor.

If an angle sensor is provided, it is advantageously possible to determine the swinging movement of the vehicle or of the first axle by this sensor due to driving over a bump.

It is advantageous in this case if at least one acceleration sensor is provided. It is possible in particular to determine the strength or intensity of the deflection of the first axle and then correspondingly of the second axle by means of an acceleration sensor. Alternatively or cumulatively it is conceivable that the intensity can be determined by means of a gradient of an angle or by means of a distance sensor. The angle refers advantageously to the angle that the vehicle or the seat or the cab experiences when driving over. The intensity can be determined depending on the change of this angle.

In general, however, the movement speed and movement direction are decisive. This takes place by integration of the acceleration values or by derivation of the position values.

A steering movement can be defined by the position of a steering wheel and a device provided for this. Due to the steering movement determined, it can be established, advantageously by means of the control unit, whether the second axle and in particular the wheels mounted on it follows the track of the first axle or not. It can thus be determined whether the second axle drives over the disturbance at all.

According to a preferred embodiment, a speed of the utility vehicle can be determined and/or transmitted by the control unit. Using the speed of the vehicle and a wheelbase, which is usually known, it can be determined by the control unit when the bump is driven over by the second axle. This is even possible if the speed of the utility vehicle should change after the bump is driven over by the first axle, according to the normal equations of motion. The speed is advantageously determined by a transmission control unit or by wheel speed sensors.

According to a particularly preferred embodiment, the suspension device comprises a vertical suspension and a horizontal suspension. It is also possible in principle that the suspension device has only a vertical suspension or only a horizontal suspension, but it is especially advantageous if both a vertical suspension and a horizontal suspension are provided, so that the vehicle seat and/or the vehicle cab can be optimally suspended, due to which a particularly pleasant driving experience is possible. The horizontal suspension is advantageously capable of providing a suspension of the vehicle seat and/or of the vehicle cab in a vehicle longitudinal direction and/or in a vehicle width direction.

According to a preferred embodiment, a resulting vertical deflection and/or a resulting horizontal deflection of the vehicle seat and/or the vehicle cab due to the force impact when driving over the bump are calculable by the control unit. The suspension device is preferably adaptable depending on the vertical deflection and/or the horizontal deflection. A limit stop can advantageously be eliminated by this.

The basic object is achieved also by a method for the suspension of a vehicle seat and/or a vehicle cab by a suspension device relative to a body floor.

The method according to the invention comprises the steps: driving over a bump with a first axle of a utility vehicle; recording of sensor data by at least one sensor; calculation of a deflection of the vehicle seat and/or the vehicle cab by a control unit using the sensor data; variation of the suspension device by the control unit before or upon driving over the disturbance. Variation of the suspension device is advantageously to be understood to mean active adjustment or control of the suspension device by the control unit.

According to a preferred embodiment, the value of the calculated deflection is compared with a 7resentable critical value of the deflection, wherein the suspension device is actively adjusted if the critical value is exceeded.

According to another preferred embodiment, the suspension device is actively adjusted or varied continuously as a function of the determined value of the deflection.

According to a preferred embodiment, values of the speed v of the utility vehicle and if applicable the steering movement are also used to calculate the deflection.

Other advantageous embodiments result from the subordinate claims.

BRIEF DESCRIPTION OF THE DRAWINGS

Other aims, advantages and functions of the present invention are to be inferred from the following from the description in connection with the drawing. In this.

DETAILED DESCRIPTION

Figure 1A:
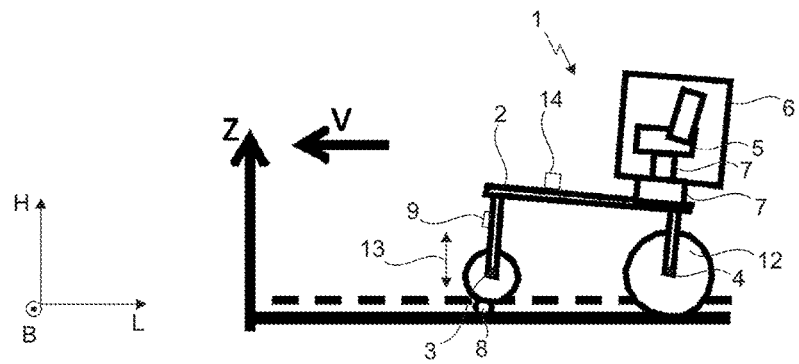
FIG. 1A shows the utility vehicle when driving over a bump with a first axle.
Figure 1B:
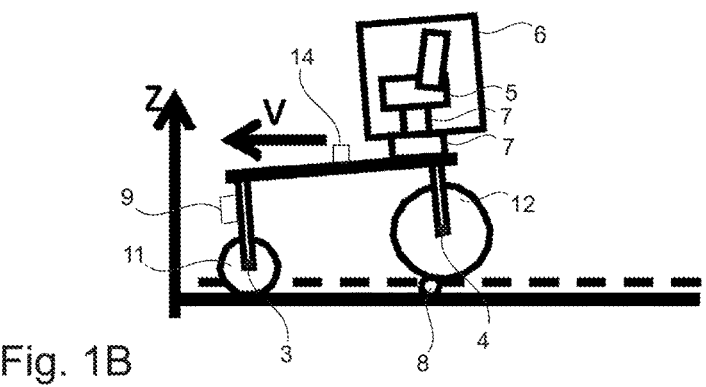
FIG. 1B shows the utility vehicle when driving over a bump with a second axle.

FIG. 1A shows a utility vehicle 1 with a body floor 2, on which a first axle 3 and a second axle 4 are arranged. Furthermore, a first wheel 11 is arranged on the first axle 3 and a second wheel 12 on the second axle 4. Naturally at least two wheels are arranged on each axle, wherein in this schematic side view only one wheel 11, 12 is recognisable on each axle 3, 4. The first axle 3 and the second axle 4 are arranged here running in a width direction B. The utility vehicle 1 is presently moving forwards at a constant speed v in a longitudinal direction L.

FIG. 1A also shows the situation in which the utility vehicle 1 is just driving over a bump 8 with the first axle 3, in particular the first wheel 11. The force acting or the deflection 13 of the first axle 3 are detected by a sensor 9 and transmitted to a control unit 14. This transfer can take place in a wired or wireless manner.

After driving over the bump 8, the utility vehicle 1 presently drives on at the constant speed v, so that after a certain time T the second axle, in particular the second wheel 12, drives over the bump 8. The time T can be calculated by means of the known equations of motion, wherein the time T is presently calculated by the control unit. The path covered between the first axle 3 and the second axle 4 corresponds to the known wheelbase.

Using the known equations of motion it is also possible to calculate the required time T by means of the control unit 14 if the speed v of the utility vehicle changes after driving over the bump with the first axle 3 and before driving over the bump 8 with the second axle 4.

The control unit 14 advantageously comprises a processor or a similar calculation unit for calculation purposes.

Figure 2:
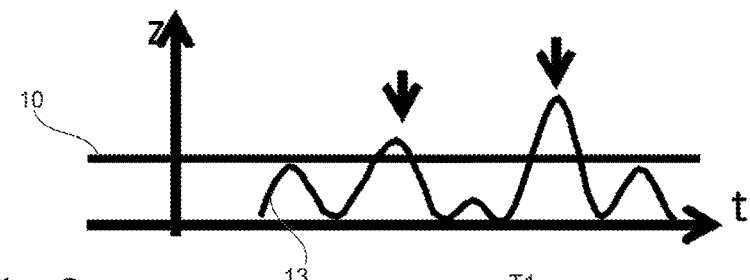
FIG. 2 shows a recorded sensor signal.

In FIG. 2, the values of the deflection recorded by the sensor 9 are shown. Moreover, a critical value of the deflection 10 according to a first preferred embodiment is shown, wherein below this value no active adjustment of any kind of the suspension device takes place, but only a passive adjustment. However, if the deflection exceeds the critical value 10, as indicated by the arrows, it is necessary to execute an active variation of the suspension device 7. Depending on the construction of the suspension device 7, thus in particular dependent on the choice of dampers, springs and/or actuators, another critical value can be specified. It is likewise conceivable to specify the critical value 10 depending on the understanding of ride comfort and the needs of the driver. This depends likewise on the nature of the terrain to be driven over and on the suspension travel of the suspension device 7 that is available.

Figure 3:
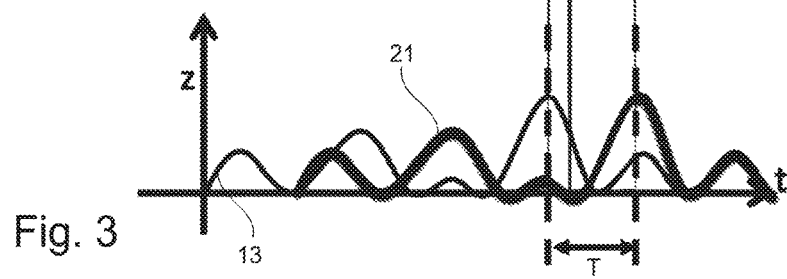
FIG. 3 shows sensor signals for the first and the second axle.

FIG. 3 shows the progression of the deflections 13 as in FIG. 2, but for both the first axle 3 and the second axle 4, wherein the deflection of the second axle 4 is provided with the reference numeral 21. Since the vehicle is presently driving at a constant speed v over the ground, the deflection 13 is displaced in time compared with the deflection 21 only by a certain time T. If the utility vehicle 1 drives at a speed of 50 km/h and has a wheelbase of 3 m, then the utility vehicle 1 drives over the bump with the second axle 4 220 ms (rounded) later than the first axle 3.

If the speed were to change after driving over the bump, then the time would naturally also change accordingly. With a constant wheelbase of 3 m, the time required for a speed of 10 km/h is 1.1 s and for a speed of 30 km/h it is 370 ms.

Since the average processing time T1 of the signals of the sensor is roughly 20 ms, the control unit can make a change to the suspension device corresponding to the deflection, so that when driving over the bump with the second axle 4 the vehicle seat and/or the vehicle cab is already preconditioned to the deflection acting on it. In general, the processing time T1 is considerably smaller than the time T by which it can be indicated when the second axle 4 drives over the bump 8.

Figure 4:
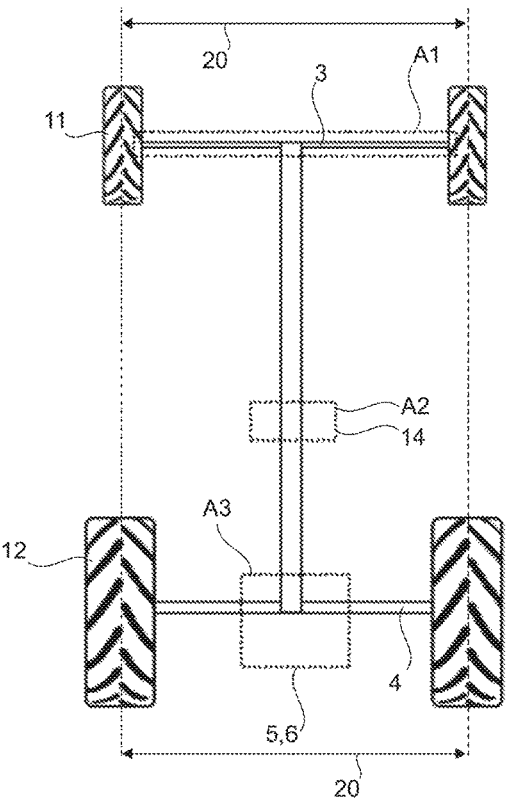
FIG. 4 shows the construction of a utility vehicle according to an embodiment.

FIG. 4 shows the structural arrangement of the first axle 3, the control unit 14 and a vehicle seat 5, wherein a vehicle cab 6 (not shown here) or a combination of the two is naturally also possible. As is to be recognised, a track width 20 of the first axle 3 is equal to the track width 20 of the second axle 4, as is prevalent in the case of larger tractors or other agricultural utility vehicles in particular. In particular, it can be determined more easily by this whether the track of the second axle 4 follows the first axle 3.

In this case the assembly A1 comprises the first axle 3 as well as the required sensors, the assembly A2 the control unit and the assembly A3 the vehicle seat and the suspension device.

It is naturally possible that only one wheel 11 drives over the bump. It is therefore advantageous to use at least two sensors 9, which can each be connected to the first axle 3. The sensors 9 are advantageously arranged at the ends of the first axle 3 in its longitudinal extension. However, if it is a single-wheel suspension, then at least one sensor 9 is arranged on each of the single axles respectively.

Figure 5A:
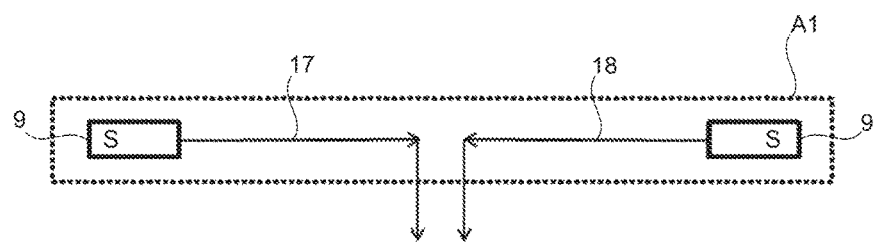
FIG. 5A shows a sensor arrangement according to an embodiment.
Figure 5B:
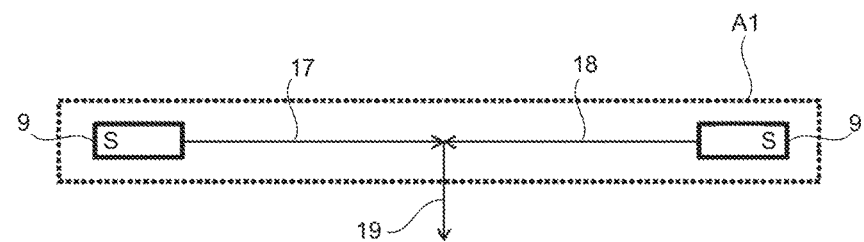
FIG. 5B shows a sensor arrangement according to another embodiment.

FIGS. 5A and 5B show two different embodiments, wherein both embodiments have two sensors 9, which are each arranged close to an end 15, 16 of the first axle 3. The sensors 9 can be an acceleration sensor or an angle sensor. It is also conceivable that both acceleration sensors and angle sensors are used.

In the embodiment according to FIG. 5A, the signals 17, 18 of the two sensors 9 are each tapped separately and transmitted to the control unit 14 (not shown here).

In the embodiment according to FIG. 5B, the signals 17, 18 of the sensors 9 are averaged by the control unit 14. In this case, the values transmitted are preferably offset with a vehicle-specific amplification factor.

However, no information may be lost by an averaging of the signals 17, 18. If single-wheel suspensions are involved here, two sensors 9 are arranged at the axle ends. The resulting vertical deflection in the middle of the vehicle as well as the resulting swinging of the first axle 3 are calculated here, wherein a conclusion can then be drawn from this about the movement of the vehicle 1, in particular when driving over a disturbance 8 with the second axle 4.

If a rigid axle is involved, on the other hand, to which the wheels can be attached, then the deflection in the middle of the vehicle is determined and the swinging of the first axle 3 is determined, advantageously by a rotation sensor.

The signals 17, 18 and the averaged signal 19 are received by the control unit 14. It is understood that the respective components have devices for transmitting and receiving signals and suitable connections, for example lines or cables, are arranged between the components for transmitting signals.

The speed v of the utility vehicle can also be determined by the control unit. In addition, it is conceivable to detect and record the steering movement.

Determination of the steering movement is sensible to the extent that it can be determined using this and with the aid of the vehicle geometry whether the second wheel, which is preferably arranged behind the first wheel seen in a longitudinal direction, also drives over the bump that is driven over by the first wheel, or whether the second wheel drives past the bump.

Moreover, it also makes sense to determine the steering movement in order to determine the effects of the bump on the horizontal suspension of the vehicle seat and/or the vehicle cab. Due to the steering movement and with the driven speed of the vehicle 1 at least a centrifugal force is produced, which acts in particular on the horizontal suspension and causes a horizontal deflection. However, this centrifugal force has a smaller influence on the suspension device than the impulse due to the second axle 4 driving over a disturbance 8. Thought has therefore been given according to the invention to determining the lift and/or the swinging of the second axle before or upon driving over the bump 8.

It is thus possible by means of the control unit to calculate the resulting vertical deflection and the resulting horizontal deflection of the suspension device and accordingly of the vehicle seat and/or the vehicle cab.

Alternatively, a second control unit can be provided, which assumes the calculation of the vertical deflection and optionally of the horizontal deflection. The first control unit then determines only the speed and optionally, if required, the steering movement. The set-up of the sensors and the control unit, if the control unit is the only control unit, is then as follows. The sensors transmit the values, signals or the like recorded to the control unit and the control unit receives these. Furthermore, the control unit determines or calculates the speed v of the vehicle and optionally the steering movement. In this case the control unit also calculates the resulting vertical and horizontal deflection of the vehicle seat and/or the vehicle cab and activates the suspension device accordingly if an override was detected in a comparison of the deflection with the critical deflection. If no override was detected, the suspension device is not activated. The value of the deflection corresponds to the resulting vertical deflection and/or horizontal deflection. Activation of the suspension device 7 is the control of the suspension and/or damping or an active control of the suspension device 7.

The critical value is preferably chosen in such a way that it corresponds to the maximum suspension travel of the suspension device, thus in particular to the maximum suspension travel in a vertical direction and the maximum suspension travel in a horizontal direction, if a horizontal suspension is present.

The suspension device of the vehicle seat and/or the vehicle cab preferably comprises at least one damper, at least one suspension element and optionally an actuator, which is preferably connectable to the suspension element.

The at least one damper can be a standard damper, which is formed for example as a single- or twin-tube damper. The suspension element can be formed in this case as a fluid spring, wherein the fluid is preferably air. It is possible by means of the actuator to influence the suspension properties of the suspension element. The height of the vehicle seat and/or the vehicle cab can preferably also be varied by a variation in the fluid spring by the actuator. Alternatively or cumulatively, the suspension device 7 can be actively adjusted by the actuator. The actuator can be formed electrically, pneumatically or hydraulically in this case.

Figure 6:
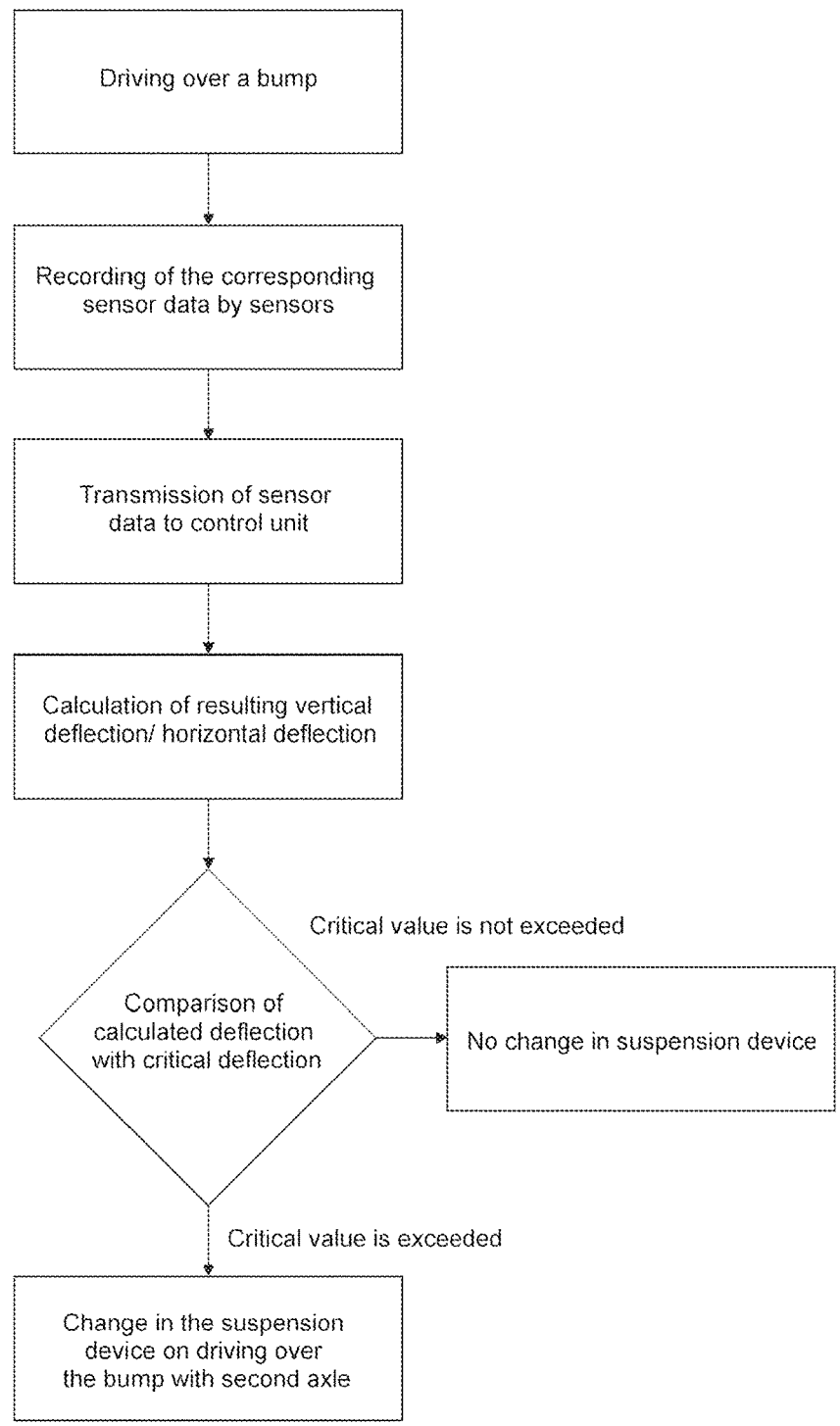
FIG. 6 shows a flow chart of a possible method.

In FIG. 6, a preferred method sequence is represented by a flow chart. Other or further method steps are naturally also conceivable here. The present embodiment here comprises a single control unit, wherein further control units are naturally also conceivable.

In a first step, the first axle 3 of the utility vehicle 1 drives over a bump 8, wherein in a following step the effects, in particular the acceleration and the amplitude of the impulse, can be recorded by at least one sensor 9. In a further step, the data recorded by the sensor 9 are transmitted to the control unit 14, wherein the control unit 14 determines the speed v of the utility vehicle 1 and if applicable a steering movement.

In particular, the values of the speed and the steering angle are transmitted and with the complete knowledge of the disturbance, the corresponding adjustment is started simultaneously with the start of the excitation of the second axle or with the start of the resulting seat and/or cab reaction, or the seat and/or the cab is/are actively preconditioned or preadjusted even before the beginning of the excitation.

A resulting vertical deflection and a resulting horizontal deflection of the vehicle seat and/or of the vehicle cab are calculated from these values and compared with a presetable critical value of the deflection. If the critical value is not exceeded, then the existing suspension travel of the suspension device is sufficient to carry out suspension or damping. In this case preferably purely passive suspension or damping is involved.

On the other hand, if the calculated value exceeds the critical value, a corresponding active adjustment of the suspension device is carried out. For example, the characteristic curve of the suspension element can be varied and/or the suspension device 7 can be actively adjusted by an actuator. By suitably varying the properties of the suspension device in such a way that the existing suspension travel is now adequate, maximum rebound of the vehicle seat and/or the vehicle cab is prevented. The variation in the properties of the suspension device is preferably made when the utility vehicle 1 drives over the bump 8 with the second axle 4, so that an optimally adjusted suspension device is present already at the time of driving over the bump 8 with the second axle.

Figure 7:
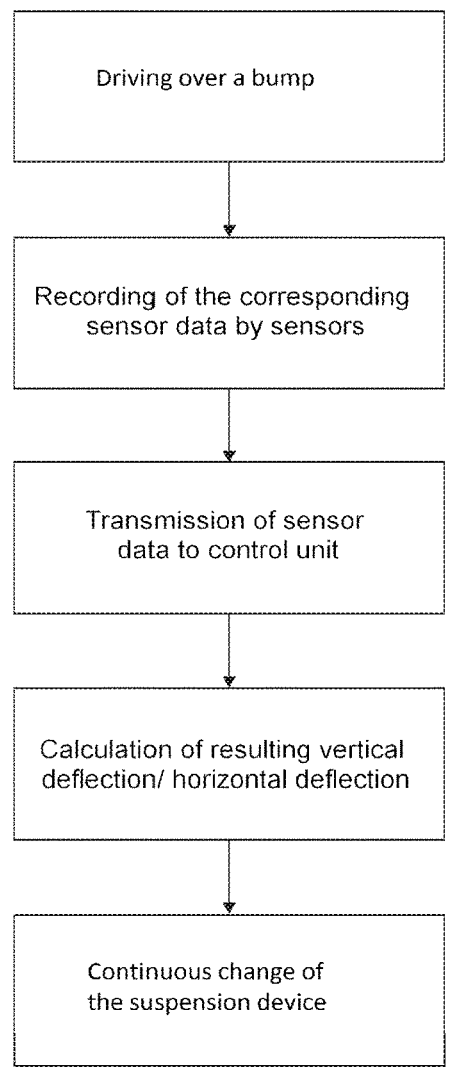
FIG. 7 shows a flow chart of another possible method.

In FIG. 7, another preferred method sequence is represented by a flow chart. Other or further method steps are naturally conceivable here too. The present embodiment in this case comprises a single control unit, wherein further control units are naturally also conceivable.

In a first step, the first axle 3 of the utility vehicle 1 drives over a bump 8, wherein in a following step, the effects, in particular the acceleration and the amplitude of the impulse, are recorded by at least one sensor 9. In a further step, the data recorded by the sensor 9 are transmitted to the control unit 14, wherein the control unit 14 determines the speed v of the utility vehicle 1 and if applicable a steering movement 1.

From these values a resulting vertical deflection and a resulting horizontal deflection of the vehicle seat and/or the vehicle cab are calculated. Due to this calculation, the suspension device 7 of the second axle 4 can now be adapted continuously to the disturbance information of the first axle 3 by the control unit 14, so that the suspension device 7 is already adjusted before or upon driving over the bump 8, wherein active adjustment in particular can take place. The adjustment of the suspension device 7 can be carried out in this case relative to the value determined, for example by means of a conversion formula or the like.

All the features disclosed in the application documents are claimed as substantial to the invention inasmuch as they are new individually or in combination compared with the prior art.

LIST OF REFERENCE NUMERALS

1 Utility vehicle
2 Body floor
3 First axle
4 Second axle
5 Vehicle seat
6 Vehicle cab
7 Suspension device
8 Bump
9 Sensor
10 Critical value
11 First wheel
12 Second wheel
13 Deflection
14 Control unit
15 First end of the first axle
16 Second end of the first axle
17 Signal
18 Signal
19 Averaged signal
20 Track width
21 Deflection
L Longitudinal direction
H Vertical direction
B Width direction

The invention claimed is:

1. A suspension unit, comprising:
a control unit, for a utility vehicle,
wherein the utility vehicle has a body floor, to which a first and a second axle are connected,
wherein the utility vehicle comprises at least one of a vehicle seat and a vehicle cab that is suspended by a suspension device relative to the body floor,
wherein the at least one of the vehicle seat and the vehicle cab is arranged substantially above the second axle seen in a vertical direction,
wherein when driving over a bump with the first axle, a value of a deflection of the first axle due to a disturbance caused by the bump is determined by at least one sensor,
wherein the suspension device of the at least one of the vehicle seat and the vehicle cab can be varied by the control unit before driving over the bump with the second axle.

2. The suspension unit according to claim 1, wherein the determined value of the deflection is comparable by the control unit with a presetable critical value, wherein when the critical value is exceeded, the suspension device is varied by the control unit.

3. The suspension unit according to claim 1, wherein the suspension device is varied by the control unit continuously as a function of the determined value of the deflection.

4. The suspension unit according to claim 1, wherein the at least one sensor is arranged on the first axle and is formed as at least one of an acceleration sensor and an angle sensor for determining at least one of a resulting deflection and a resulting swinging movement of the front axle.

5. The suspension unit according to claim 1, wherein a speed of the utility vehicle is determined by the control unit.

6. The suspension unit according to claim 4, wherein a resulting vertical deflection and a resulting horizontal deflection of at least one of the vehicle seat and the vehicle cab is calculated by the control unit and the suspension device is adjustable depending on at least one of the vertical deflection and the horizontal deflection.

7. The suspension unit according to claim 1, wherein the suspension device comprises at least one damper element and at least one suspension element.

8. The suspension unit according to claim 1, wherein the suspension device comprises at least one actuator, which is operable at least one of electrically, pneumatically, and hydraulically.

9. A method for suspending at least one of a vehicle seat and a vehicle cab by means of a suspension device relative to a body floor, comprising:
 a. driving over a bump with a first axle of a utility vehicle;
 b. recording sensor data generated by at least one sensor as a result of driving over the bump with the first axle of the utility vehicle;
 c. calculating by a control unit a deflection of at least one of the vehicle seat and the vehicle cab using the sensor data;
 d. varying the suspension device by the control unit before driving over the bump with a second axle of the utility vehicle.

10. The suspension unit according to claim 5, wherein a steering movement is determined by the control unit.

11. The suspension unit according to claim 1, wherein the at least one sensor is mounted to the first axle of the utility vehicle.

12. The suspension unit according to claim 1, wherein the suspension unit includes at least two sensors that are each connected to the first axle.

\* \* \* \* \*